United States Patent
Lin et al.

(10) Patent No.: US 12,512,765 B2
(45) Date of Patent: Dec. 30, 2025

(54) METHOD AND APPARATUS FOR CONTROLLING RECTIFIER

(71) Applicant: CONTEMPORARY AMPEREX TECHNOLOGY (HONG KONG) LIMITED, Hong Kong (CN)

(72) Inventors: Guiying Lin, Ningde (CN); Meng Wu, Ningde (CN); Jinfeng Gao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 348 days.

(21) Appl. No.: 18/471,291

(22) Filed: Sep. 21, 2023

(65) Prior Publication Data
US 2024/0014726 A1    Jan. 11, 2024

Related U.S. Application Data

(63) Continuation of application No. PCT/CN2022/073714, filed on Jan. 25, 2022.

(51) Int. Cl.
*H02M 7/219*    (2006.01)
*H02M 1/00*    (2007.01)
*H02M 7/217*    (2006.01)

(52) U.S. Cl.
CPC ......... *H02M 7/219* (2013.01); *H02M 1/0012* (2021.05); *H02M 7/2173* (2013.01)

(58) Field of Classification Search
CPC ... H02M 1/0012; H02M 7/2173; H02M 7/219
See application file for complete search history.

(56) References Cited

U.S. PATENT DOCUMENTS

| | | | | |
|---|---|---|---|---|
| 6,297,980 | B1* | 10/2001 | Smedley | H02J 3/01 363/47 |
| 2007/0216373 | A1* | 9/2007 | Smedley | H02M 7/53875 323/223 |
| 2022/0206082 | A1* | 6/2022 | He | H02M 1/32 |

FOREIGN PATENT DOCUMENTS

| | | |
|---|---|---|
| CN | 102868309 A | 1/2013 |
| CN | 103904922 A | 7/2014 |

(Continued)

OTHER PUBLICATIONS

The World Intellectual Property Organization (WIPO) International Search Report and written opinion for PCT/CN2022/073714 Sep. 6, 2022 13 pages (including English translation).

(Continued)

*Primary Examiner* — Jue Zhang
(74) *Attorney, Agent, or Firm* — ANOVA LAW GROUP, PLLC

(57) ABSTRACT

A method for controlling a rectifier includes determining reactive power and active power according to sampled voltages and sampled currents of a three-phase alternating current signal, determining given active power according to a given voltage and a sampled voltage of a direct current signal, determining a target voltage vector for model predictive control according to the active power, the reactive power, the given active power, and a damping-injected Hamiltonian dissipative model, performing the model predictive control according to the target voltage vector to obtain a control signal for the rectifier, and controlling the rectifier according to the control signal.

19 Claims, 5 Drawing Sheets

(56) References Cited

FOREIGN PATENT DOCUMENTS

| | | | |
|---|---|---|---|
| CN | 107196342 A | 9/2017 |
| CN | 107317490 A | 11/2017 |
| CN | 108321812 A | 7/2018 |
| CN | 108880374 A | 11/2018 |
| CN | 109038581 A | 12/2018 |
| CN | 109245571 A | 1/2019 |
| CN | 111355257 A | 6/2020 |
| CN | 111668867 A | 9/2020 |
| CN | 112909991 A | 6/2021 |

OTHER PUBLICATIONS

The European Patent Office (EPO) The Extended European Search Report for Application No. 22922604.8 Apr. 23, 2024 9 Pages.

Yuanbo Guo et al. "Modeling method for power electronic system based on Hamilton principle of analytical mechanics." 2009 IEEE 6th International Power Electronics and Motion Control Conference. IEEE, 2009. p. 988-992.

Yonghao Gui et al. "Improved DC-link voltage regulation strategy for grid-connected converters." IEEE Transactions on Industrial Electronics 68.6 (2020): 4977-4987.

Fengxiang Wang et al., "Passivity-based model predictive control of three-level inverter-fed induction motor." IEEE Transactions on Power Electronics 36.2 (2020): 1984-1993.

\* cited by examiner

METHOD AND APPARATUS FOR CONTROLLING RECTIFIER

CROSS-REFERENCE TO RELATED APPLICATION

This application is a continuation of International Application No. PCT/CN2022/073714, filed on Jan. 25, 2022, the entire content of which is incorporated herein by reference.

TECHNICAL FIELD

The present application relates to the field of power electronics, and more particularly to a method and an apparatus for controlling a rectifier.

BACKGROUND

An ideal power system continuously supplies stable and reliable electric energy to a user at a standard sine wave with a rated voltage and a constant frequency (50 Hz or 60 Hz). With the development of industrial technology and the needs of production, especially the development of power electronic technology in recent decades, most of the electric energy supplied by the power system is supplied to power consumption devices for use after secondary transformation of the power electronic technology.

There may be a phenomenon of weak grid due to impedance of a power transmission line, which causes a rectifier to fail to output a stable current when the rectifier in the weak grid is connected to the grid.

SUMMARY

The present application provides a method and an apparatus for controlling a rectifier, which could enable the rectifier to output a stable current when the rectifier in a weak grid is connected to the grid.

In a first aspect of the present application, a method for controlling a rectifier is provided, and the rectifier is configured to convert a three-phase alternating current signal into a direct current signal. The method includes: determining active power and reactive power according to sampled voltages and sampled currents of the three-phase alternating current signal; determining given active power according to a given voltage and a sampled voltage of the direct current signal; determining a target voltage vector for model predictive control according to the active power, the reactive power and the given active power as well as a Hamiltonian dissipative model with injected damping; performing the model predictive control according to the target voltage vector, to obtain a control signal for the rectifier; and controlling the rectifier according to the control signal.

In the embodiments of the present application, the rectifier is controlled by combining the damping-injected Hamiltonian dissipative model with the model predictive control. Due to damping injected, the Hamiltonian dissipative model can weaken impedance of a power transmission line and play a role of enhancing stability of a system, and the model predictive control can compensate for the defect of a slightly slow dynamic response of the Hamiltonian dissipative model and accelerate the response time of the system. Therefore, the above solution could effectively control the rectifier to output a stable current.

In some possible embodiments, the determining a target voltage vector for model predictive control according to the active power, the reactive power and the given active power as well as a damping-injected Hamiltonian dissipative model, includes: determining a d-axis component and a q-axis component of the target voltage vector according to the active power, the reactive power and the given active power as well as and the damping-injected Hamiltonian dissipative model; and transforming the d-axis component and the q-axis component of the target voltage vector into an α-axis component and a β-axis component of the target voltage vector through inverse Park transformation.

In the embodiments of the present application, the target voltage vector for model predictive control is determined through the damping-injected Hamiltonian dissipative model, and the system response can be accelerated using rolling optimization of the model predictive control.

In some possible embodiments, the d-axis component $V_d$ and the q-axis component $V_q$ of the target voltage vector are respectively:

$$V_d = E_m - \frac{2}{3}L_g\frac{P^*}{E_m} + \frac{2}{3}\omega L_g\frac{Q}{E_m} - \frac{2}{3}R_g\frac{P^*}{E_m} - \frac{2}{3}R_i\frac{(P^*-P)}{E_m}, \text{ and}$$

$$V_q = -\frac{2}{3}L_g\frac{Q^*}{E_m} - \frac{2}{3}\omega L_g\frac{P}{E_m} - \frac{2}{3}R_g\frac{Q^*}{E_m} - \frac{2}{3}R_i\frac{(Q^*-Q)}{E_m},$$

where $E_m = \sqrt{E_\alpha^2 + E_\beta^2}$, $E_\alpha$ and $E_\beta$ are voltages of an orthogonal stationary coordinate system, $R_i$ is injected damping, P* is the given active power, P is the active power, Q* is given reactive power, Q is the reactive power, ω is an angular frequency of the three-phase alternating current signal, $L_g$ is a three-phase alternating current reactor inductance value of the three-phase alternating current signal, and $R_g$ is a three-phase alternating current reactor resistance value of the three-phase alternating current signal.

In the embodiments of the present application, the impedance of the line can be weakened and the stability of the system can be enhanced through an equation of state after damping is injected into a public access point.

In some possible embodiments, the performing the model predictive control according to the target voltage vector, to obtain a control signal for the rectifier, includes: determining a voltage vector closest to the target voltage vector; and serving a control signal corresponding to the voltage vector closest to the target voltage vector as the control signal for the rectifier.

In the embodiments of the present application, after the target voltage vector is obtained, the voltage vector closest to the target voltage vector is sought within a specified range, and the control signal corresponding to the voltage vector is applied to the rectifier without other modulation strategies, which is insensitive to the grid frequency, and can keep stable under the working condition of wide fluctuation of the frequency.

In some possible embodiments, the control signal for the rectifier satisfies:

$$S_{opt} = \mathrm{argmin}_s(V_\alpha^p(S)-V_\alpha)^2 + (V_\beta^p(S)-V_\beta)^2,$$

where S represents the control signal, $V_\alpha^p(S)$ and $V_\beta^p(S)$ are functions of S, $$\begin{pmatrix} V_\alpha^p(S) \\ V_\beta^p(S) \end{pmatrix} = \frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix} SV_{dc},$$

-continued $$S = \begin{pmatrix} S_a \\ S_b \\ S_c \end{pmatrix}, S_x \in \{0, 1\}, x = \{a, b, c\},$$

and $V_\alpha$ and $V_\beta$ are an α-axis component and a β-axis component of the target voltage vector.

Based on the above solution, the voltage vector closest to the target voltage vector can be determined, and then the control signal for the rectifier is obtained.

In some possible embodiments, the determining active power and reactive power according to sampled voltages and sampled currents of the three-phase alternating current signal, includes: transforming the sampled voltages and the sampled currents of the three-phase alternating current signal into orthogonal stationary coordinate system voltages and orthogonal stationary coordinate system currents through Clark transformation; and determining the active power and the reactive power according to the orthogonal stationary coordinate system voltages and the orthogonal stationary coordinate system currents.

In the embodiments of the present application, the voltage and current values of the three-phase alternating current signal and the orthogonal stationary coordinate system voltage and current values can be transformed to each other through Clark transformation.

In some possible embodiments, the active power P and the reactive power Q are respectively:

$$P = E_\alpha * I_\alpha + E_\beta * I_\beta, \quad Q = E_\beta * I_\alpha - E_\alpha * I_\beta$$

where $E_\alpha$ and $E_\beta$ are the orthogonal stationary coordinate system voltages; and $I_\alpha$ and $I_\beta$ are the orthogonal stationary coordinate system currents.

In the embodiments of the present application, according to the voltage values and the current values of the orthogonal stationary coordinate system obtained after the Clarke transformation, the active power P and the reactive power Q are further obtained, to be introduced into the damping-injected Hamiltonian dissipative model to obtain the target voltage vector.

In some possible embodiments, the determining given active power according to a given voltage and a sampled voltage of the direct current signal, includes: determining the given active power according to the given voltage and the sampled voltage of the direct current signal as well as a proportional integral controller.

In the embodiments of the present application, the given active power is obtained according to the calculation by the proportional integral controller in an outer loop of the system voltage, and the given active power value is a stable value of the active power after a period.

In some possible embodiments, the given active power is an output of the proportional integral controller, and a proportional integral transfer function of the proportional integral controller is:

$$F(s) = K_p + \frac{K_i}{s}$$

where an input of the proportional integral controller is $V^*_{dc} - V_{dc}$, and $V^*_{dc}$ and $V_{dc}$ are respectively the given voltage and the sampled voltage of the direct current signal; and $K_p$ and $K_i$ are respectively a proportional gain and an integral gain.

In a second aspect of the present application, an apparatus for controlling a rectifier is provided, and the rectifier is configured to convert a three-phase alternating current signal into a direct current signal. The apparatus includes: an acquiring module configured to acquire sampled voltages and sampled currents of the three-phase alternating current signal and a given voltage and a sampled voltage of the direct current signal; a processing module configured to: determine active power and reactive power according to the sampled voltages and the sampled currents of the three-phase alternating current signal; determine given active power according to the given voltage and the sampled voltage of the direct current signal; determine a target voltage vector for model predictive control according to the active power, the reactive power and the given active power as well as a damping-injected Hamiltonian dissipative model; and perform the model predictive control according to the target voltage vector, to obtain a control signal for the rectifier; and a control module configured to control the rectifier according to the control signal.

In some possible embodiments, the processing module is configured to: determine a d-axis component and a q-axis component of the target voltage vector according to the active power, the reactive power and the given active power as well as the damping-injected Hamiltonian dissipative model; and transform the d-axis component and the q-axis component of the target voltage vector into an α-axis component and a β-axis component of the target voltage vector according to inverse Park transformation.

In some possible embodiments, an α-axis component and a β-axis component of the target voltage vector are respectively:

$$V_d = E_m - \frac{2}{3}L_g\frac{P^*}{E_m} + \frac{2}{3}\omega L_g\frac{Q}{E_m} - \frac{2}{3}R_g\frac{P^*}{E_m} - \frac{2}{3}R_i\frac{(P^* - P)}{E_m}, \text{ and}$$

$$V_q = -\frac{2}{3}L_g\frac{Q^*}{E_m} - \frac{2}{3}\omega L_g\frac{P}{E_m} - \frac{2}{3}R_g\frac{Q^*}{E_m} - \frac{2}{3}R_i\frac{(Q - Q)}{E_m}, \text{ where}$$

$$E_m = \sqrt{E_\alpha^2 + E_\beta^2},$$

$E_\alpha$ and $E_\beta$ are orthogonal stationary coordinate system voltages, $R_i$ is injected damping, $P^*$ is the given active power, P is the active power, $Q^*$ is given reactive power, Q is the reactive power, ω is an angular frequency of the three-phase alternating current signal, $L_g$ is a three-phase alternating current reactor inductance value of the three-phase alternating current signal, and $R_g$ is a three-phase alternating current reactor resistance value of the three-phase alternating current signal.

In some possible embodiments, the processing module is configured to: determine a voltage vector closest to the target voltage vector; and serve a control signal corresponding to the voltage vector closest to the target voltage vector as the control signal for the rectifier.

In some possible embodiments, the control signal for the rectifier satisfies:

$$S_{opt} = \text{argmin}_s(V_\alpha^p(S) - V_\alpha)^2 + (V_\beta^p(S) - V_\beta)^2,$$

where S represents the control signal, $V_\alpha^p(S)$ and $V_\beta^p(S)$ are functions of S, $$\begin{pmatrix} V_\alpha^p(S) \\ V_\beta^p(S) \end{pmatrix} = \frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix} SV_{dc},$$

$$S = \begin{pmatrix} S_a \\ S_b \\ S_c \end{pmatrix}, S_x \in \{0, 1\}, x = \{a, b, c\},$$

and $V_\alpha$ and $V_\beta$ are an α-axis component and a β-axis component of the target voltage vector.

In some possible embodiments, the processing module is configured to: transform the sampled voltages and the sampled currents of the three-phase alternating current signal into orthogonal stationary coordinate system voltages and orthogonal stationary coordinate system currents through Clark transformation; and determine the active power and the reactive power according to the orthogonal stationary coordinate system voltages and the orthogonal stationary coordinate system currents.

In some possible embodiments, the active power P and the reactive power Q are respectively:

$$P = E_\alpha * I_\alpha + E_\beta * I_\beta, \quad Q = E_\beta * I_\alpha - E_\alpha * I_\beta$$

where $E_\alpha$ and $E_\beta$ are the orthogonal stationary coordinate system voltages; and $I_\alpha$ and $I_\beta$ are the orthogonal stationary coordinate system currents.

In some possible embodiments, the processing module is configured to: determine the given active power according to the given voltage and the sampled voltage of the direct current signal as well as a proportional integral controller.

In some possible embodiments, the given active power is an output of the proportional integral controller, and a proportional integral transfer function of the proportional integral controller is:

$$F(s) = K_p + \frac{K_i}{s}$$

where an input of the proportional integral controller is $V^*_{dc} - V_{dc}$, and $V^*_{dc}$ and $V_{dc}$ are respectively the given voltage and the sampled voltage of the direct current signal; and $K_p$ and $K_i$ are respectively a proportional gain and an integral gain.

In a third aspect of the present application, an apparatus for controlling a rectifier is provided, including a processor and a memory, the memory is configured to store a computer program, and the processor is configured to call the computer program to execute the method in the first aspect or any possible implementation manner of the first aspect.

In a fourth aspect of the present application, a computer-readable storage medium is provided, and configured to store a computer program, and the computer program is configured to execute the method in the above first aspect or any possible implementation manner of the first aspect.

BRIEF DESCRIPTION OF THE DRAWINGS

In order to illustrate the technical solutions in the embodiments of the present application more clearly, brief description will be made below to the accompanying drawings required in the embodiments of the present application. Apparently, the accompanying drawings described below are some embodiments of the present application only, and other drawings could be obtained based on these accompanying drawings by those ordinary skilled in this art without creative efforts.

Figure 1:
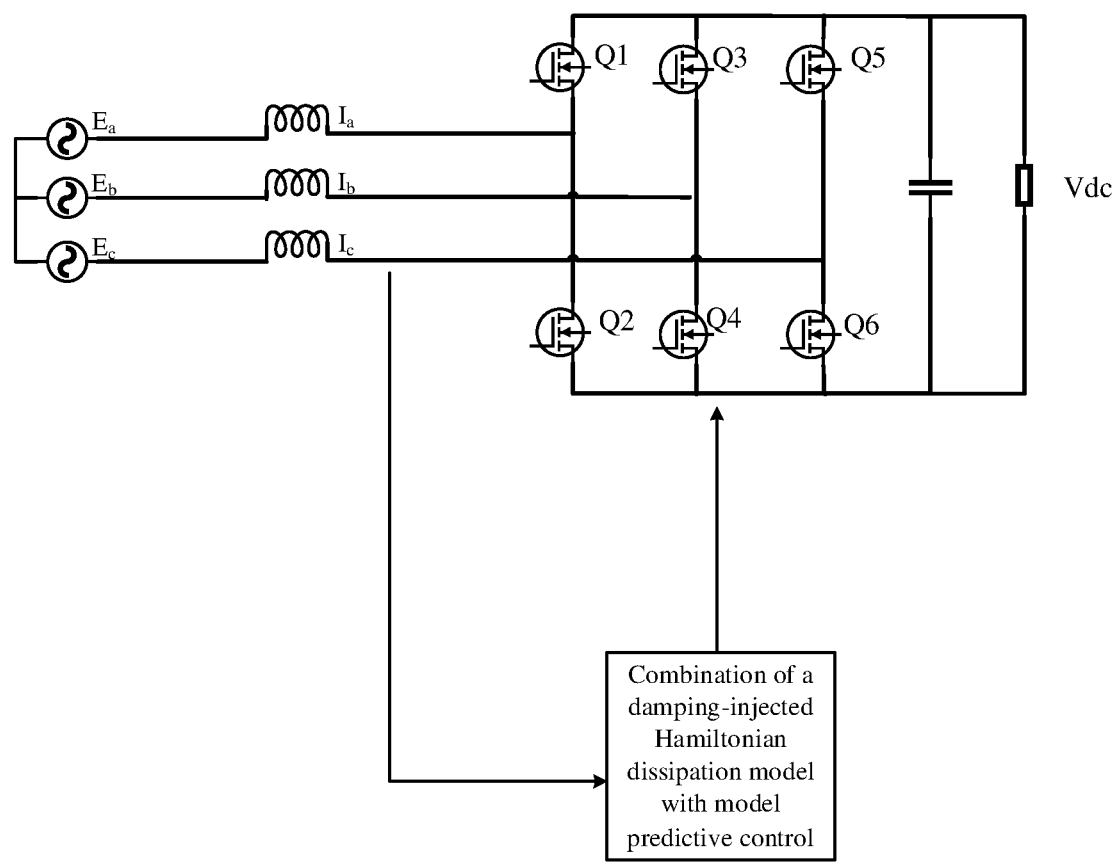
FIG. 1 is a schematic diagram of an application scenario of a method for controlling a rectifier disclosed in an embodiment of the present application.

In the accompanying drawings, the accompanying drawings are not necessarily drawn to actual scale.

DESCRIPTION OF EMBODIMENTS

To make the objectives, technical solutions and advantages of the embodiments of the present application clearer, the technical solutions in the embodiments of the present application will be described clearly below with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the brief description of the drawings described above are intended to cover non-exclusive inclusions. The terms such as "first" and "second" in the specification and the claims of the present application as well as the drawings described above are used to distinguish different objects, and shall not be used to indicate a specific order or primary-secondary relationship.

The phrase "embodiment" mentioned in the present application means that the specific features, structures, or characteristics described with reference to the embodiment may be included in at least one embodiment of the present application. The phrase at various locations in the specification does not necessarily refer to the same embodiment, or an independent or alternative embodiment that is mutually exclusive from another embodiment. Those skilled in the art understand, in explicit and implicit manners, that the embodiments described in the present application may be combined with another embodiment.

In the description of the present application, it should be noted that, unless explicitly specified and defined otherwise, the terms "installation", "interconnection", "connection", "attachment" and "arrangement" should be understood in a broad sense; for example, they may be either a fixed connection, or a detachable connection, or an integrated connection; and they may be either a direct connection, an indirect connection through an intermediate medium, or communication between interiors of two elements. Those of ordinary skill in the art may appreciate the specific meanings of the foregoing terms in the present application according to specific conditions.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relationship.

Due to impedance of a power transmission line, the phenomenon of weak grid often occurs in remote areas and rural areas, and when a rectifier is running, the terminal voltage at the grid-connected port of the rectifier is not equal to the actual voltage of the grid, thereby resulting in phenomena of instable resonance and frequency, and the like. At present, there are two main methods to deal with this phenomenon: one is to modify the rectifier itself that produce harmonics and reactive power, however, the conventional rectifier cannot suppress grid harmonics caused by other loads in the grid; and the other is to add harmonic filtering and reactive power compensation apparatuses, however, the existing method is to add a repetitive controller, which is extremely sensitive to the grid frequency, and once the grid frequency is not 50 Hz, the control performance will be greatly deteriorated. In addition, the repetitive control needs to develop specific data, the memory consumption is extremely huge, and the control is relatively difficult.

In view of this, an embodiment of the present application provides a method for controlling a rectifier, and the rectifier is controlled by combining a damping-injected Hamiltonian dissipative model with model predictive control. Due to damping injection, the Hamiltonian dissipative model can weaken of a power transmission line and play a role of enhancing stability of a system, and the model predictive control can compensate for the defect of a relatively slow dynamic response of the Hamiltonian dissipative model and accelerate the response time of the system, so that the rectifier can be effectively controlled output a stable current.

The model predictive control is a special kind of control. Its current control action is obtained by solving an optimal control problem of a finite time-domain open loop at each sampling instant. A current state in the process is used as an initial state of the optimal control problem, and an optimal control sequence obtained only implements the first control action. Generally, model prediction has the following advantages: (1) the requirement for precision of a model is not high, modeling is convenient, and the process description can be obtained by simple experiments; (2) a non-minimization described model is used, and the system is of better robustness and stability; and (3) a rolling optimization strategy is used instead of global one-time optimization, it can make up for uncertainty caused by factors of model mismatch, distortion and interference in time, and the dynamic performance is better.

Damping is an ability of a vibrating system to convert a portion of energy in a vibration process into another form of energy during each vibration cycle, and in short, the amplitude of oscillations in the system is reduced. Large damping can accelerate the decrease of the amplitude of the system to return to a steady state. The specific performance is: small vibration, quick stop, and stable stop.

The Hamilton's principle points out that when the system $q_I$ evolves to $q_F$, its real orbit is always a condition of taking an extremum for an action I. Specifically, when infinitesimal perturbations $\delta_{q_i}$ and $\delta_{(dqi/dt)}$ are given to generalized coordinates and velocities, the action is very stable without perturbations, that is, $\delta_I=0$. Therefore, the essence of the Hamilton's principle is the stability principle of an orbit, and a particle always chooses the most stable orbit when it moves from $q_I$ to $q_F$. The Hamilton's principle is applicable not only to a point system with finite degrees of freedom, but also to a point system with infinite degrees of freedom. In a dissipative system, the Hamilton's principle can be used to construct a Hamiltonian dissipative model to solve complex problems in the dissipative system.

FIG. 1 is a schematic diagram of an application scenario of a technical solution of an embodiment of the present application. As shown in FIG. 1, a rectifier includes six switches Q1 to Q6 and is configured to convert a three-phase alternating current signal into a direct current signal. The rectifier is also referred to as a pulse width modulation (PWM) rectifier. In the embodiment of the present application, a control signal for the rectifier is obtained according to the combination of a damping-injected Hamiltonian dissipative model with model predictive control, so that the rectifier outputs a stable current and overcomes the influence of weak grid.

Figure 2:
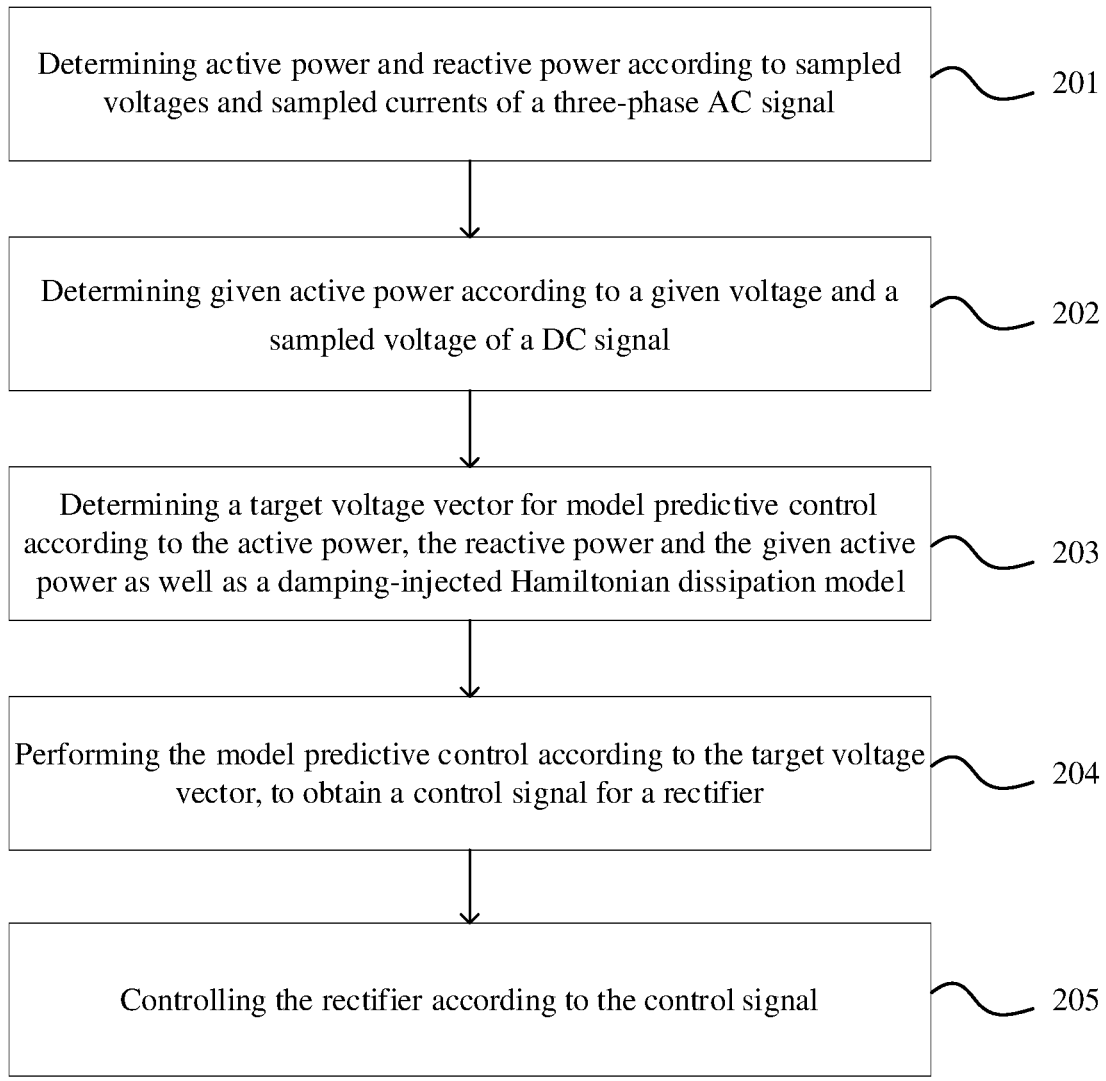
FIG. 2 is a schematic flowchart of a method for controlling a rectifier disclosed in an embodiment of the present application.

FIG. 2 is a schematic flowchart of a method for controlling a rectifier disclosed in an embodiment of the present application. This method can be used to control the rectifier in FIG. 1.

201, active power and reactive power are determined according to sampled voltages and sampled currents of a three-phase alternating current signal.

The three-phase alternating current signal is an alternating current electrical signal provided by a grid. The sampled voltages and the sampled currents of the three-phase alternating current signal refer to sampled values of voltage and current of the three-phase alternating current signal.

The active power refers to alternating current energy actually emitted or consumed per unit time, and is average power in a cycle. The reactive power means that, in an alternating current circuit with reactance, although the average power of an electric field or magnetic field is zero throughout the cycle, energy is constantly exchanged between a power supply and a reactance component (for example, a capacitor, an inductor), and the maximum value of the energy exchange rate between them is "reactive power".

202, given active power is determined according to a given voltage and a sampled voltage of a direct current signal.

The given voltage of the direct current signal refers to a target value of voltage of the direct current signal converted from the three-phase alternating current signal by the rectifier, that is, a stable value of the circuit voltage after a period, which can be also referred to as a voltage given.

The sampled voltage of the direct current signal refers to a sampled value of voltage of the direct current signal converted from the three-phase alternating current signal by the rectifier.

The given active power refers to a stable value of the active power after a period, that is, a target value of the active power, which can be also referred to as active power given.

203, a target voltage vector for model predictive control is determined according to the active power, the reactive power and the given active power as well as a damping-injected Hamiltonian dissipative model.

The Hamiltonian dissipative model is constructed using the Hamilton's principle, and the target voltage vector is obtained from the foregoing active power, reactive power and given active power. Given reactive power involved in the operation can be a set value, such as 0. The given reactive power is a stable value of the reactive power after a period, that is, a target value of the reactive power, which can be also referred to as reactive power given.

The target voltage vector is also referred to as an optimal voltage vector, which is a voltage vector corresponding to optimal control of the model predictive control.

204, the model predictive control is performed according to the target voltage vector, to obtain a control signal for a rectifier.

205, the rectifier is controlled according to the control signal.

In the embodiments of the present application, the rectifier is controlled by combining the damping-injected Hamiltonian dissipative model with the model predictive control. Due to damping injected, the Hamiltonian dissipative model can weaken impedance of a power transmission line and play a role of enhancing stability of a system, and the model predictive control can compensate for the defect of a slightly slow dynamic response of the Hamiltonian dissipative model and accelerate the response time of the system, so that the rectifier can be effectively controlled to output a stable current.

Figure 3:
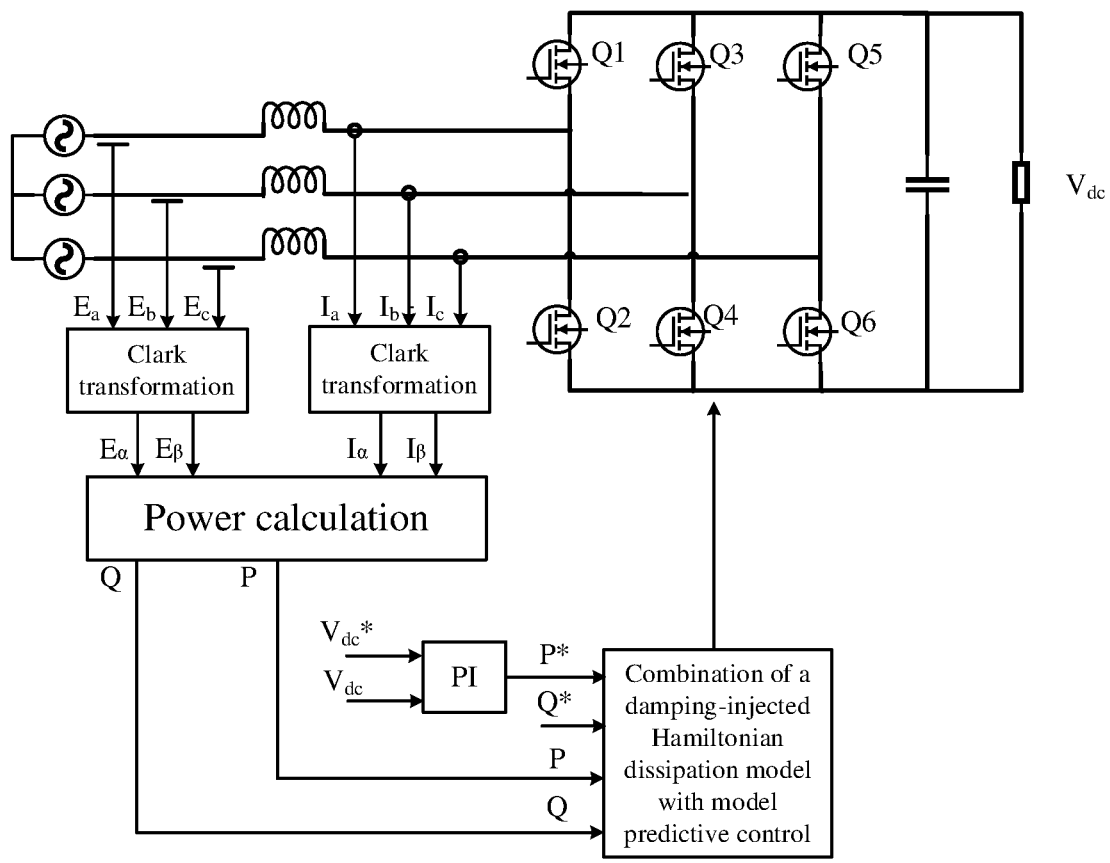
FIG. 3 is an architecture diagram of a method for controlling a rectifier disclosed in an embodiment of the present application.
Figure 4:
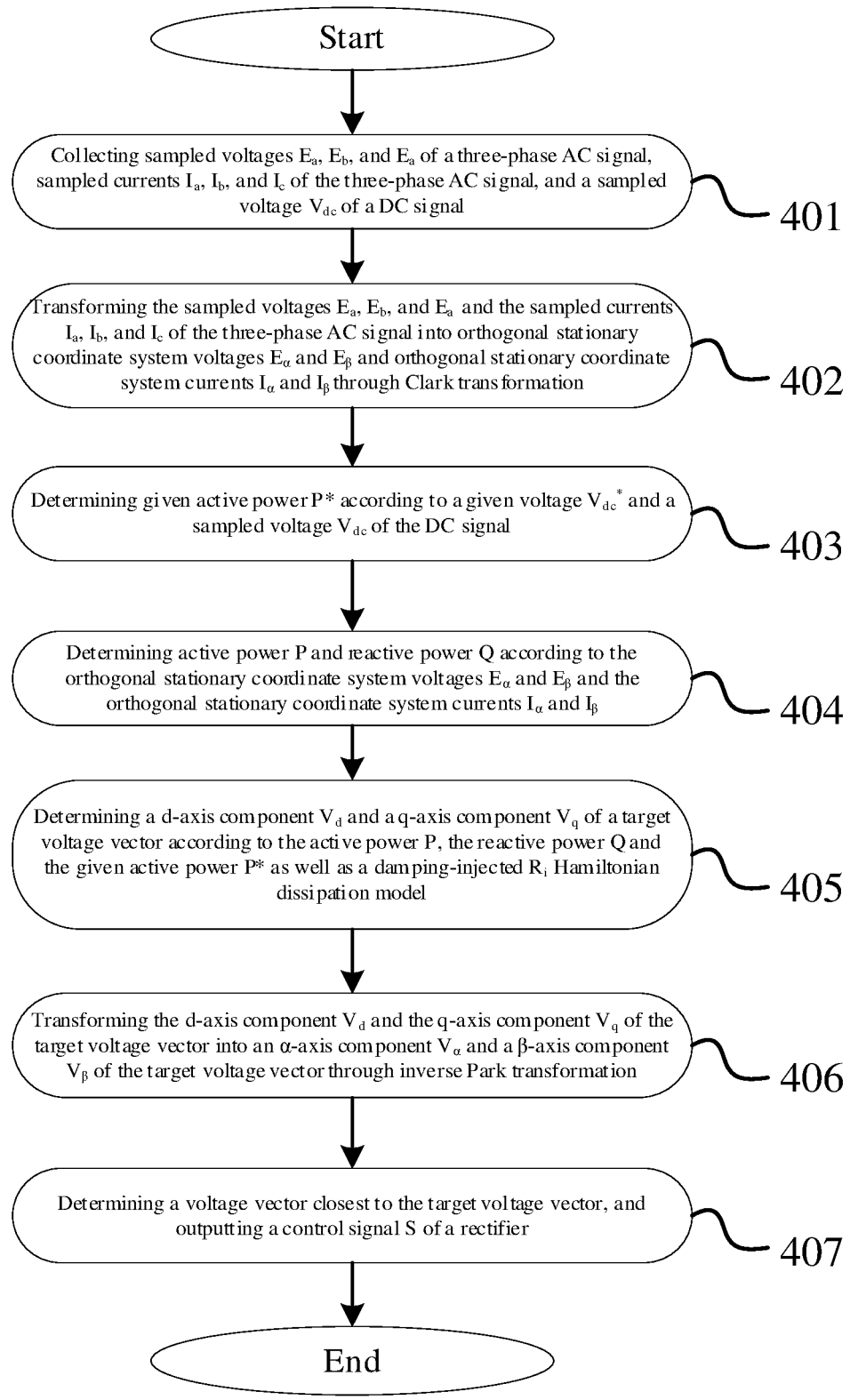
FIG. 4 is a schematic flowchart of a method for controlling a rectifier disclosed in an embodiment of the present application.

FIG. 3 is an architecture diagram of a method for controlling a rectifier disclosed in an embodiment of the present application, and FIG. 4 is a schematic flowchart of a method for controlling a rectifier disclosed in an embodiment of the present application. The method for controlling a rectifier in the embodiments of the present application will be further described below with reference to FIG. 3 and FIG. 4.

401, sampled voltages $E_a$, $E_b$, and $E_c$ of a three-phase alternating current signal, sampled currents $I_a$, $I$, and $I_c$ of the three-phase alternating current signal, and a sampled voltage $V_{dc}$ of a direct current signal are collected.

402, the sampled voltages $E_a$, $E_b$, and $E_c$ and the sampled currents $I_a$, $I_b$, and $I_c$ of the three-phase alternating current signal are transformed into orthogonal stationary coordinate system voltages $E_\alpha$ and $E_\beta$ and orthogonal stationary coordinate system currents $I_\alpha$ and $I_\beta$ through Clark transformation.

In the embodiments of the present application, the Clarke transformation transforms time-domain components of a three-phase system (in an abc coordinate system) into two components in an orthogonal stationary coordinate system ($\alpha\beta$). $\alpha\beta$ components and abc components of a vector can be transformed to each other through the Clarke transformation and inverse Clarke transformation. The difference lies in that the $\alpha\beta$ components and the abc components are orthogonal to each other with a phase difference of 90°, the abc components have a phase difference of 220° therebetween, and these two kinds of components are all alternating current quantities.

Optionally, the Clark transformation of current and voltage is:

$$\begin{pmatrix} E_\alpha \\ E_\beta \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} E_a \\ E_b \\ E_c \end{pmatrix}, \text{ and}$$

$$\begin{pmatrix} I_\alpha \\ I_\beta \end{pmatrix} = \frac{2}{3} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} I_a \\ I_b \\ I_c \end{pmatrix}$$

403, given active power P* is determined according to a given voltage $V^*_{dc}$ and a sampled voltage $V_{dc}$ of a direct current signal.

Optionally, the given active power P* can be determined according to the given voltage $V^*_{dc}$ and the sampled voltage $V_{dc}$ of the direct current signal as well as a proportional integral controller (PI).

The proportional integral control constructs a control deviation according to a given value and an actual output value, and the deviation is proportional, integral and differential to construct a control quantity by linear combination through linear combination to control a controlled object.

The given active power P* is determined according to the given voltage $V^*_{dc}$ and the sampled voltage $V_{dc}$ of the direct current signal as well as the proportional integral controller, and this method has simple algorithm, good robustness and high reliability.

For example, the given active power P* is an output of the proportional integral controller, and a proportional integral transfer function of the proportional integral controller is:

$$F(s) = K_p + \frac{K_i}{s}$$

Two parameters, a proportional gain $K_p$ and an integral gain $K_i$, constitute time constants of a closed-loop regulator. These time constants area equivalent to time constants for outputting loads, and cancel each other out in a structural transfer function of a closed-loop automatic regulation system, so that the automatic regulation process loaded in the system converges in a steady state. If the time constants of the proportional gain $K_p$ and integral gain $K_i$ do not match the time constants of the regulator for outputting loads, the steady-state process of the regulation system will oscillate or diverge, and the system cannot work normally.

404, active power P and reactive power Q are determined according to the orthogonal stationary coordinate system voltages $E_\alpha$ and $E_\beta$ and the orthogonal stationary coordinate system currents $I_\alpha$ and $I_\beta$.

Optionally, the active power P and the reactive power Q are respectively:

$$P = E_\alpha * I_\alpha + E_\beta * I_\beta, \quad Q = E_\beta * I_\alpha - E_\alpha * I_\beta$$

In the above solution, according to the voltage values $E_\alpha$ and $E_\beta$ and the current values $I_\alpha$ and $I_\beta$ of the orthogonal stationary coordinate system obtained through the Clarke transformation, the active power P and the reactive power Q are further obtained, to be introduced into a Hamiltanian dissipative model with injected damping $R_i$.

405, a d-axis component $V_d$ and a q-axis component $V_q$ of a target voltage vector are determined according to the active power P, the reactive power Q and the given active power P* as well as the damping-injected Hamiltonian dissipative model.

For this rectifier, the damping-injected Hamiltonian dissipative model is constructed using the Hamilton's principle to obtained an equation of state, and the active power P, reactive power Q, the given active power P* and given reactive power Q* are brought into the equation of state to get the d-axis component $V_d$ and the q-axis component $V_q$ of the target voltage vector.

For example, the d-axis component $V_d$ and the q-axis component $V_q$ of the target voltage vector are respectively:

$$V_d = E_m - \frac{2}{3} L_g \frac{P^*}{E_m} + \frac{2}{3} \omega L_g \frac{Q}{E_m} - \frac{2}{3} R_g \frac{P^*}{E_m} - \frac{2}{3} R_i \frac{(P^* - P)}{E_m}, \text{ and}$$

-continued
$$V_q = -\frac{2}{3}L_g\frac{Q^*}{E_m} - \frac{2}{3}\omega L_g\frac{P}{E_m} - \frac{2}{3}R_g\frac{Q^*}{E_m} - \frac{2}{3}R_i\frac{(Q^*-Q)}{E_m}, \text{ where}$$

$$E_m = \sqrt{E_\alpha^2 + E_\beta^2},$$

ω is an angular frequency of the three-phase alternating current signal for indicating the change speed of the three-phase alternating current signal, $L_g$ is a three-phase alternating current reactor inductance value of the three-phase alternating current signal, and $R_g$ is a three-phase alternating current reactor resistance value of the three-phase alternating current signal.

In the above solution, the impedance of the line can be weakened and the stability of the system can be enhanced through an equation of state after damping is injected into a public access point.

406, the d-axis component $V_d$ and the q-axis component $V_q$ of the target voltage vector are transformed into an α-axis component $V_\alpha$, and a β-axis component $V_\beta$ of the target voltage vector through inverse Park transformation.

The d-axis component $V_d$ and the q-axis component $V_q$ of the vector are obtained by rotation transformation of the α-axis component $V_\alpha$ of and the β-axis component $V_\beta$ of a voltage vector, these two kinds of components can be transformed to each other through Park transformation and the inverse Park transformation, and the transformation requires an angle θ of the current grid voltage. The difference between These two kinds of components lies in that the d-axis component $V_d$ and the q-axis component $V_q$ of the vector are direct current, while the α-axis component $V_\alpha$, of and the β-axis component $V_\beta$ of the voltage vector are alternating current.

The Park transformation is a transformation of coordinates commonly used for analyzing the operation of a synchronous motor, it projects three-phase currents abc of a stator substrate to a direct axis (d axis), a quadrature axis (q axis) and a zero axis (0 axis) perpendicular to a dq plane that rotate with a rotor, so as to realize diagonalization of an electronic inductance matrix, that is, an abc coordinate system is transformed into a dq coordinate system.

Optionally, the inverse Park transformation formula of the voltage vector is:

$$\begin{pmatrix} V_\alpha \\ V_\beta \end{pmatrix} = \begin{pmatrix} \cos(\theta) & -\sin(\theta) \\ \sin(\theta) & -\cos(\theta) \end{pmatrix} \begin{pmatrix} V_d \\ V_q \end{pmatrix}$$

407, a voltage vector closest to the target voltage vector is determined, and a control signal S of a rectifier is output.

The output control signal S of the rectifier is a control signal S corresponding to the voltage vector closest to the target voltage vector.

Optionally, the control signal S of the rectifier satisfies:

$$S_{opt} = \text{argmin}_s (V_\alpha^p(S) - V_\alpha)^2 + (V_\beta^p(S) - V_\beta)^2,$$

$$\begin{pmatrix} V_\alpha^p(S) \\ V_\beta^p(S) \end{pmatrix} = \frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix} SV_{dc},$$

$$S = \begin{pmatrix} S_a \\ S_b \\ S_c \end{pmatrix}, S_x \in \{0,1\}, x = \{a,b,c\}$$

S has a total of eight states, correspondingly, a total of eight voltage vectors. On this basis, model predictive control is performed, the voltage vector closest to the target voltage vector can be sought among the eight voltage vectors to obtain its corresponding control signal $S_{opt}$, and the control signal S opt is output to the rectifier, so as to control the rectifier to output a stable current.

The control manner in the present application is passive control. In the passive control, the influence of unbalanced factors from a source end and a load end, such as constant power loads and weak grid, can be offset due to the damping injection. An object model used for model prediction focuses on the precise prediction for the controlled object. The control signal is obtained by combining the damping-injected Hamiltonian dissipative model with the model predictive control, and the control signal is directly applied to the rectifier without modulation strategies, which improves the response speed; only one damping coefficient needs to be tuned, and the control parameters are easily adjusted; and the grid frequency information is not required in the whole process, and it is insensitive to the grid frequency, and can keep stable under the working condition of wide fluctuation of the frequency.

The method for controlling the rectifier according to the embodiments of the present application are described above, an apparatus for controlling a rectifier according to the embodiments of the present application will be described below, and reference can be made to the foregoing various embodiments for the parts that are not described in detail.

Figure 5:
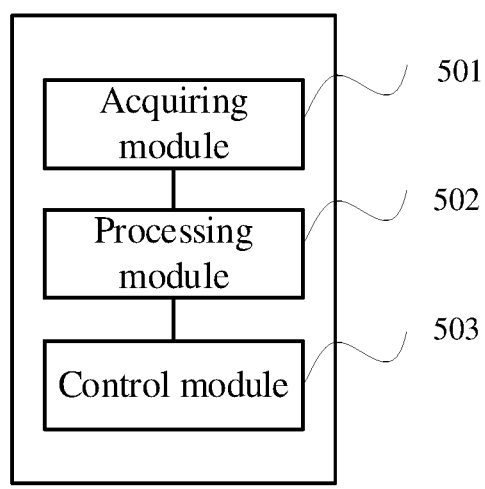
FIG. 5 is a schematic block diagram of an apparatus for controlling a rectifier disclosed in an embodiment of the present application.

FIG. 5 is a schematic diagram of an apparatus for controlling a rectifier disclosed in an embodiment of the present application. In the embodiment of the present application, the apparatus for controlling the rectifier may include an acquiring module 501, a processing module 502, and a control module 503.

The acquiring module 501 is configured to acquire sampled voltages and sampled currents of a three-phase alternating current signal and a given voltage and a sampled voltage of a direct current signal;

The processing module 502 can be configured to: determine active power and reactive power according to the sampled voltages and the sampled currents of the three-phase alternating current signal; determine given active power according to the given voltage and the sampled voltage of the direct current signal; determine a target voltage vector for model predictive control according to the active power, the reactive power and the given active power as well as a damping-injected Hamiltonian dissipative model; and perform the model predictive control according to the target voltage vector, to obtain a control signal for the rectifier; and The control module 503 can be configured to control the rectifier according to the control signal.

In an embodiment of the present application, the processing module 502 is configured to determine the given active power according to the given voltage and the sampled voltage of the direct current signal as well as a proportional integral controller.

In an embodiment of the present application, the processing module 502 is configured to: transform the sampled voltages and the sampled currents of the three-phase alternating current signal into orthogonal stationary coordinate system voltages and n orthogonal stationary coordinate system currents through Clark transformation; and determine the active power and the reactive power according to the orthogonal stationary coordinate system voltages and the orthogonal stationary coordinate system currents.

In an embodiment of the present application, the processing module 502 is configured to: determine a d-axis component and a q-axis component of the target voltage vector according to the active power, the reactive power and the given active power as well as the damping-injected Hamiltonian dissipative model; and transform the d-axis component and the q-axis component of the target voltage vector into an α-axis component and a β-axis component of the target voltage vector according to inverse Park transformation.

In an embodiment of the present application, the processing module 502 is further configured to: determine a voltage vector closest to the target voltage vector; and serve a control signal corresponding to the voltage vector closest to the target voltage vector as the control signal for the rectifier.

An embodiment of the present application further provides another apparatus for controlling a rectifier, and the apparatus includes a memory and a processor, where the memory is configured to store instructions, and the processor is configured to read the instructions and execute the method according to the foregoing embodiments of the present application based on the instructions.

An embodiment of the present application further provides a readable storage medium configured to store a computer program, and the computer program is configured to execute the method in the foregoing embodiments of the present application.

In the embodiments of the present application, the rectifier is controlled by combining the damping-injected Hamiltonian dissipative model with the model predictive control, which can weaken impedance of the power transmission line, enhance stability of the system, and accelerate the response time of the system, so as to effectively control the rectifier to output a stable current.

Although the present application has been described with reference to some embodiments thereof, various modifications can be made thereto without departing from the scope of the present application, and the components therein can be replaced with equivalents. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A method for controlling a rectifier configured to convert a three-phase alternating current signal into a direct current signal, the method comprising:
   determining active power and reactive power according to sampled voltages and sampled currents of the three-phase alternating current signal;
   determining given active power according to a given voltage and a sampled voltage of the direct current signal;
   determining a target voltage vector for model predictive control according to the active power, the reactive power, the given active power, and a damping-injected Hamiltonian dissipative model;
   performing the model predictive control according to the target voltage vector, to obtain a control signal for the rectifier; and
   controlling the rectifier according to the control signal.

2. The method according to claim 1, wherein determining the target voltage vector for the model predictive control according to the active power, the reactive power, the given active power, and the damping-injected Hamiltonian dissipative model comprises:
   determining a d-axis component and a q-axis component of the target voltage vector according to the active power, the reactive power, the given active power, and the damping-injected Hamiltonian dissipative model; and
   transforming the d-axis component and the q-axis component of the target voltage vector into an α-axis component and a β-axis component of the target voltage vector through inverse Park transformation.

3. The method according to claim 2, wherein the d-axis component $V_d$ and the q-axis component $V_q$ of the target voltage vector are respectively:

$$V_d = E_m - \frac{2}{3}L_g\frac{P^*}{E_m} + \frac{2}{3}\omega L_g\frac{Q}{E_m} - \frac{2}{3}R_g\frac{P^*}{E_m} - \frac{2}{3}R_i\frac{(P^*-P)}{E_m}, \text{ and}$$

$$V_q = -\frac{2}{3}L_g\frac{Q^*}{E_m} - \frac{2}{3}\omega L_g\frac{P}{E_m} - \frac{2}{3}R_g\frac{Q^*}{E_m} - \frac{2}{3}R_i\frac{(Q^*-Q)}{E_m}, \text{ wherein}$$

$$E_m = \sqrt{E_\alpha^2 + E_\beta^2},$$

$E_\alpha$ and $E_\beta$ are voltages of an orthogonal stationary coordinate system, $R_i$ is injected damping, P* is the given active power, P is the active power, Q* is reactive power given, Q is the reactive power, ω is an angular frequency of the three-phase alternating current signal, $L_g$ is a three-phase alternating current reactor inductance value of the three-phase alternating current signal, and $R_g$ is a three-phase alternating current reactor resistance value of the three-phase alternating current signal.

4. The method according to claim 1, wherein performing the model predictive control according to the target voltage vector, to obtain the control signal for the rectifier, comprises:
   determining a voltage vector closest to the target voltage vector; and
   using a control signal corresponding to the voltage vector closest to the target voltage vector as the control signal for the rectifier.

5. The method according to claim 4, wherein the control signal for the rectifier satisfies:

$$S_{opt} = \text{argmin}_s(V_\alpha^P(S) - V_\alpha)^2 + (V_\beta^P(S) - V_\beta)^2,$$

wherein S represents the control signal, $V_\alpha^P(S)$ and $I_\beta^P(S)$ are functions of S, $$\begin{pmatrix} V_\alpha^p(S) \\ V_\beta^p(S) \end{pmatrix} = \frac{2}{3}\begin{pmatrix} 1 & -\frac{1}{2} & -\frac{1}{2} \\ 0 & \frac{\sqrt{3}}{2} & -\frac{\sqrt{3}}{2} \end{pmatrix} SV_{dc}, S = \begin{pmatrix} S_a \\ S_b \\ S_c \end{pmatrix},$$

$$S_x \in \{0, 1\}, x = \{a, b, c\},$$

and $V_\alpha$ and $V_\beta$ are an α-axis component and a β-axis component of the target voltage vector.

6. The method according to claim 1, wherein determining the active power and the reactive power according to the sampled voltages and the sampled currents of the three-phase alternating current signal comprises:
   transforming the sampled voltages and the sampled currents of the three-phase alternating current signal into orthogonal stationary coordinate system voltages and orthogonal stationary coordinate system currents through Clark transformation; and determining the active power and the reactive power according to the orthogonal stationary coordinate system voltages and the orthogonal stationary coordinate system currents.

7. The method according to claim 6, wherein the active power P and the reactive power Q are respectively:

$$P=E_\alpha*I_\alpha+E_\beta*I_\beta, Q=E_\beta*I_\alpha-E_\alpha*I_\beta$$

wherein $E_\alpha$ and $E_\beta$ are the orthogonal stationary coordinate system voltages; and $I_\alpha$ and $I_\beta$ are the orthogonal stationary coordinate system currents.

8. The method according to claim 1, wherein determining the given active power according to the given voltage and the sampled voltage of the direct current signal comprises:
determining the given active power according to the given voltage and the sampled voltage of the direct current signal, and a proportional integral controller.

9. The method according to claim 8, wherein the given active power is an output of the proportional integral controller, and a proportional integral transfer function of the proportional integral controller is:

$$F(s) = K_p + \frac{K_i}{s}$$

wherein an input of the proportional integral controller is $V^*_{dc}-V_{dc}$, and $V^*_{dc}$ and $V_{dc}$ are respectively the given voltage and the sampled voltage of the direct current signal; and $K_p$ and $K_i$ are respectively a proportional gain and an integral gain.

10. A non-transitory computer-readable storage medium, storing a computer program, and the computer program is configured to cause a processor to execute the method according to claim 1.

11. An apparatus for controlling a rectifier configured to convert a three-phase alternating current signal into a direct current signal, the apparatus comprising:
an acquiring module configured to acquire sampled voltages and sampled currents of the three-phase alternating current signal and a given voltage and a sampled voltage of the direct current signal;
a processing module configured to:
determine active power and reactive power according to the sampled voltages and the sampled currents of the three-phase alternating current signal;
determine given active power according to the given voltage and the sampled voltage of the direct current signal;
determine a target voltage vector for model predictive control according to the active power, the reactive power, the given active power, and a damping-injected Hamiltonian dissipative model; and
perform the model predictive control according to the target voltage vector, to obtain a control signal for the rectifier; and
a control module configured to control the rectifier according to the control signal.

12. The apparatus according to claim 11, wherein the processing module is configured to:
determine a d-axis component and a q-axis component of the target voltage vector according to the active power, the reactive power, the given active power, and the damping-injected Hamiltonian dissipative model; and
transform the d-axis component and the q-axis component of the target voltage vector into an α-axis component and a β-axis component of the target voltage vector according to inverse Park transformation.

13. The apparatus according to claim 11, wherein an α-axis component and a β-axis component of the target voltage vector are respectively:

$$V_d = E_m - \frac{2}{3}L_g\frac{P^*}{E_m} + \frac{2}{3}\omega L_g\frac{Q}{E_m} - \frac{2}{3}R_g\frac{P^*}{E_m} - \frac{2}{3}R_i\frac{(P^*-P)}{E_m}, \text{ and}$$

$$V_q = -\frac{2}{3}L_g\frac{Q^*}{E_m} - \frac{2}{3}\omega L_g\frac{P}{E_m} - \frac{2}{3}R_g\frac{Q^*}{E_m} - \frac{2}{3}R_i\frac{(Q^*-Q)}{E_m}, \text{ wherein}$$

$$E_m = \sqrt{E_\alpha^2 + E_\beta^2},$$

$E_\alpha$ and $E_\beta$ are orthogonal stationary coordinate system voltages, $R_i$ is injected damping, $P^*$ is the given active power, $P$ is the active power, $Q^*$ is given reactive power, $Q$ is the reactive power, $\omega$ is an angular frequency of the three-phase alternating current signal, $L_g$ is a three-phase alternating current reactor inductance value of the three-phase alternating current signal, and $R_g$ is a three-phase alternating current reactor resistance value of the three-phase alternating current signal.

14. The apparatus according to claim 11, wherein the processing module is configured to:
determine a voltage vector closest to the target voltage vector; and
use a control signal corresponding to the voltage vector closest to the target voltage vector as the control signal for the rectifier.

15. The apparatus according to claim 14, wherein the control signal for the rectifier satisfies:

$$S_{opt}=\text{argmin}_s(V_\alpha^p(S)-V_\alpha)^2+(V_\beta^p(S)-V_\beta)^2,$$

wherein S represents the control signal, $V_\alpha^p(S)$ and $V_\beta^p(S)$ are functions of S, $$\begin{pmatrix}V_\alpha^p(S)\\V_\beta^p(S)\end{pmatrix} = \frac{2}{3}\begin{pmatrix}1 & -\frac{1}{2} & -\frac{1}{2}\\0 & \frac{\sqrt{3}}{2} & -\frac{\sqrt{3}}{2}\end{pmatrix}SV_{dc}, S = \begin{pmatrix}S_a\\S_b\\S_c\end{pmatrix},$$

$$S_x \in \{0, 1\}, x = \{a, b, c\},$$

and $V_\alpha$ and $V_\beta$ are an α-axis component and a β-axis component of the target voltage vector.

16. The apparatus according to claim 11, wherein the processing module is configured to:
transform the sampled voltages and the sampled currents of the three-phase alternating current signal into orthogonal stationary coordinate system voltages and orthogonal stationary coordinate system currents through Clark transformation; and
determine the active power and the reactive power according to the orthogonal stationary coordinate system voltages and the orthogonal stationary coordinate system currents.

17. The apparatus according to claim 16, wherein the active power P and the reactive power Q are respectively:

$$P=E_\alpha*I_\alpha+E_\beta*I_\beta, Q=E_\beta*I_\alpha-E_\alpha*I_\beta$$

wherein $E_\alpha$ and $E_\beta$ are the orthogonal stationary coordinate system voltages; and $I_\alpha$ and $I_\beta$ are the orthogonal stationary coordinate system currents.

18. The apparatus according to claim 11, wherein the processing module is configured to:

determine the given active power according to the given voltage and the sampled voltage of the direct current signal, and a proportional integral controller.

19. The apparatus according to claim 18, wherein the given active power is an output of the proportional integral controller, and a proportional integral transfer function of the proportional integral controller is:

$$F(s) = K_p + \frac{K_i}{s}$$

wherein an input of the proportional integral controller is $V^*_{dc} - V_{dc}$, and $V^*_{dc}$ and $V_{dc}$ are respectively the given voltage and the sampled voltage of the direct current signal; and $K_p$ and $K_i$ are respectively a proportional gain and an integral gain.

* * * * *